Oct. 5, 1965                K. H. BURGIN                 3,209,913
                         WATER INTAKE CLEANER
Filed June 19, 1962                                 4 Sheets-Sheet 4
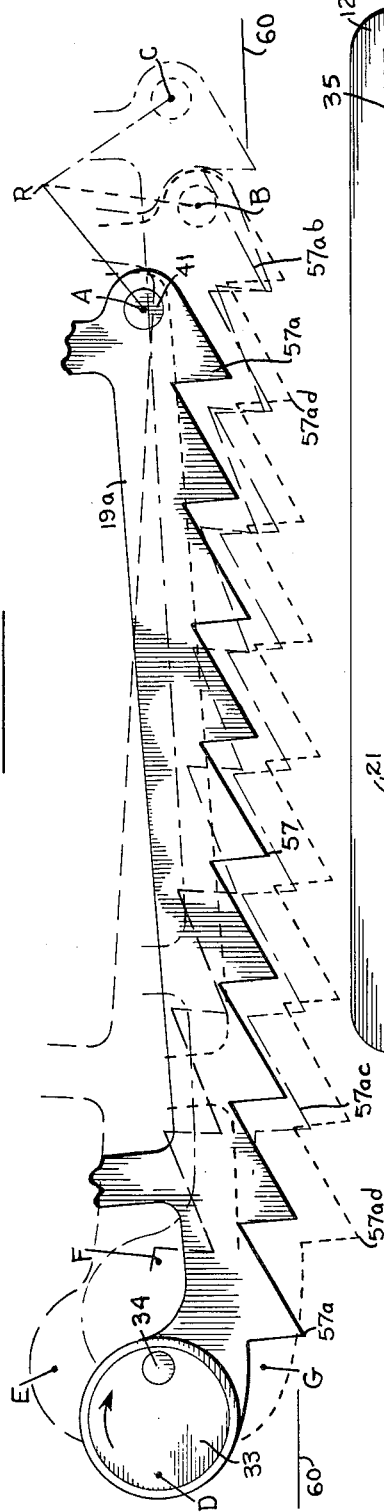
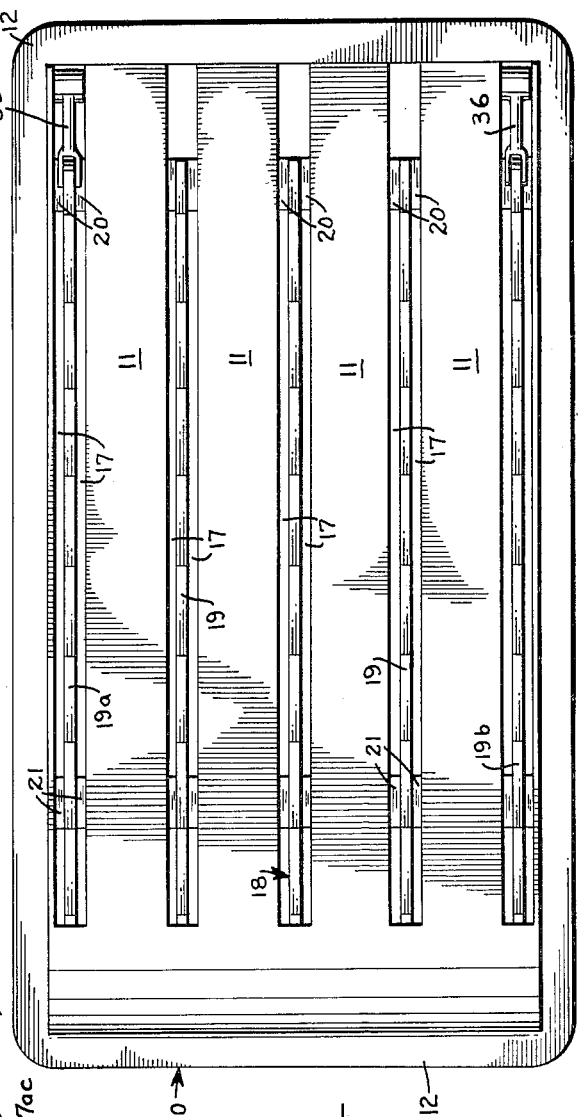
INVENTOR
KERMIT H. BURGIN
BY Herbert A. Weintraub
ATTORNEY United States Patent Office 3,209,913
Patented Oct. 5, 1965

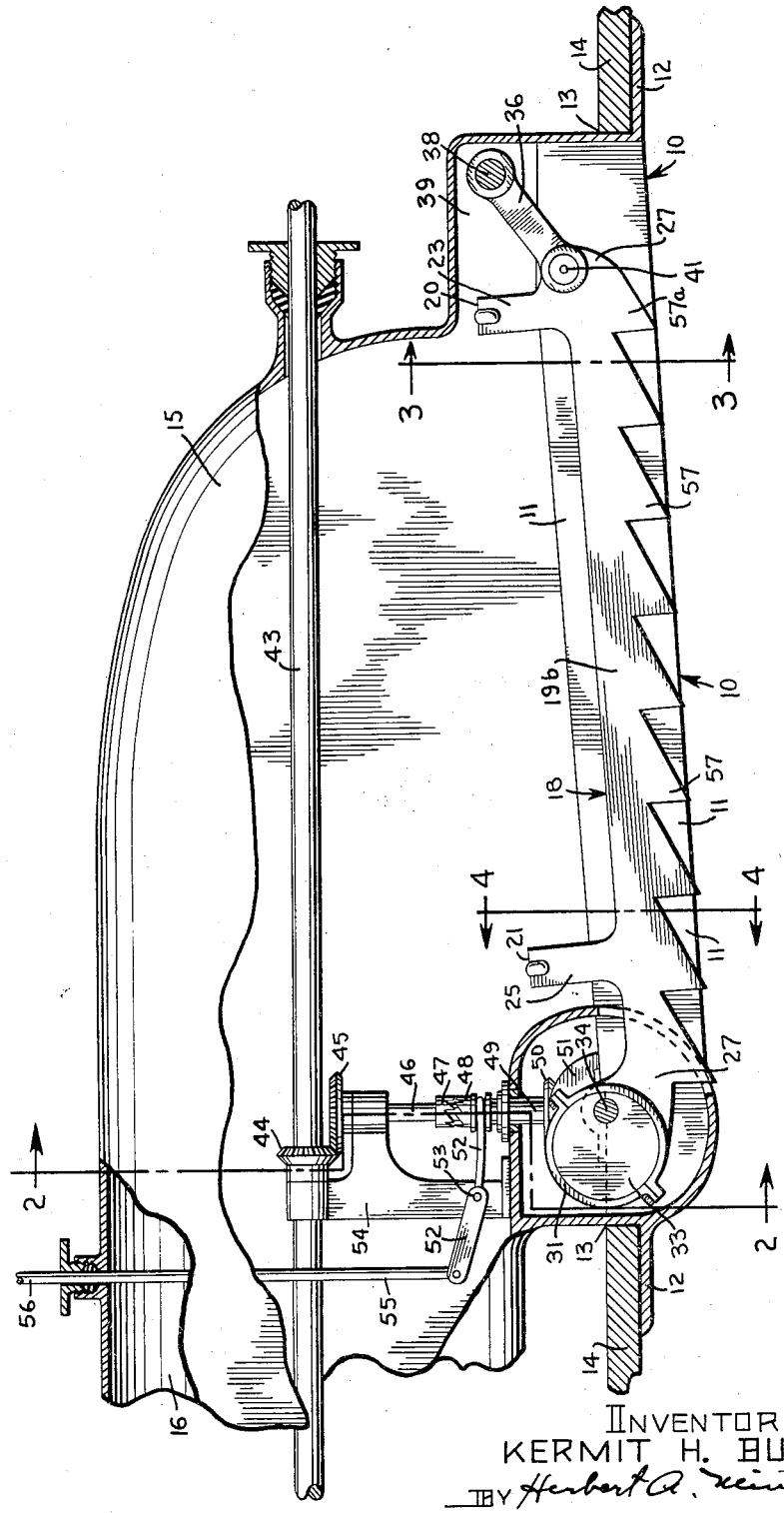

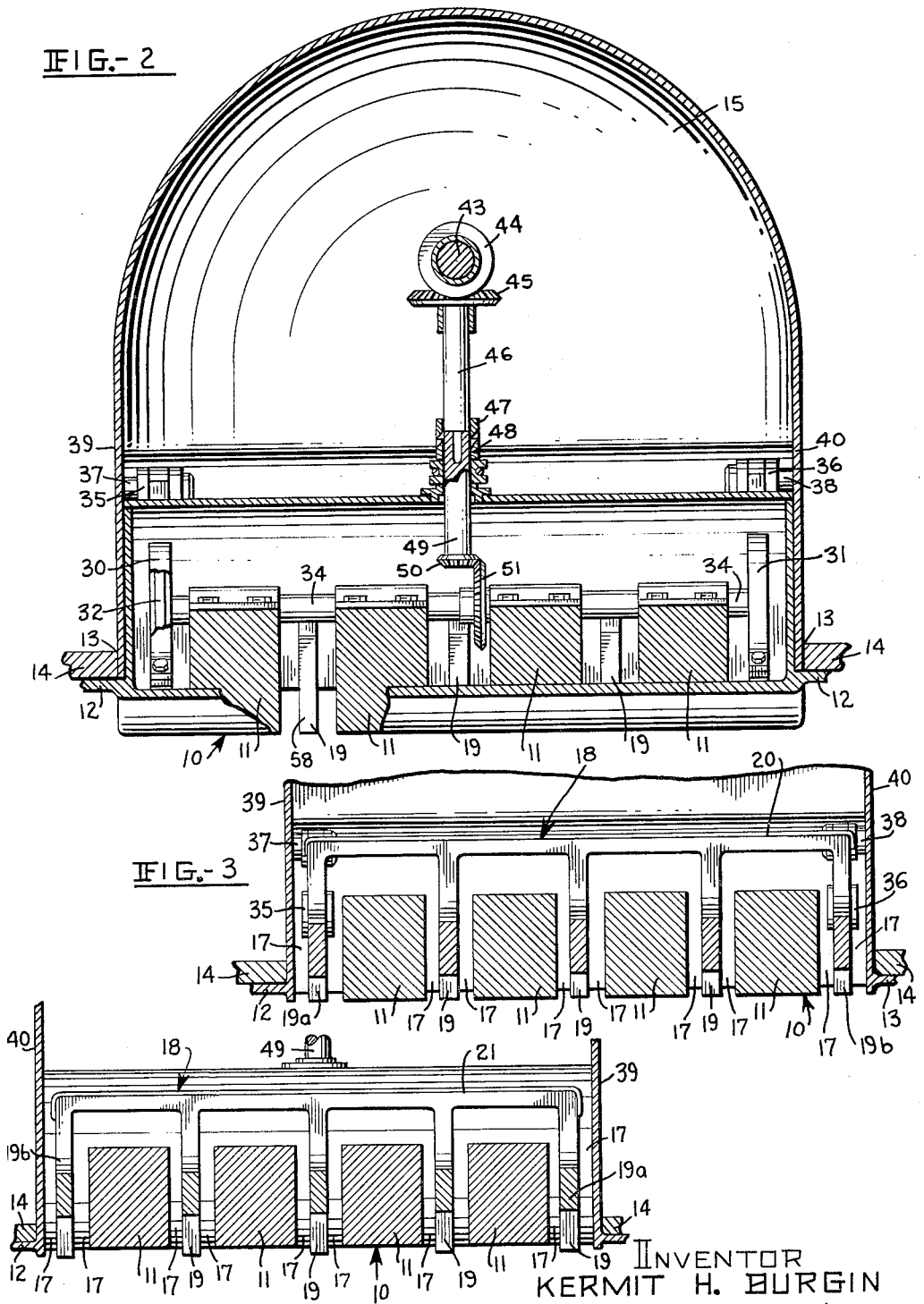

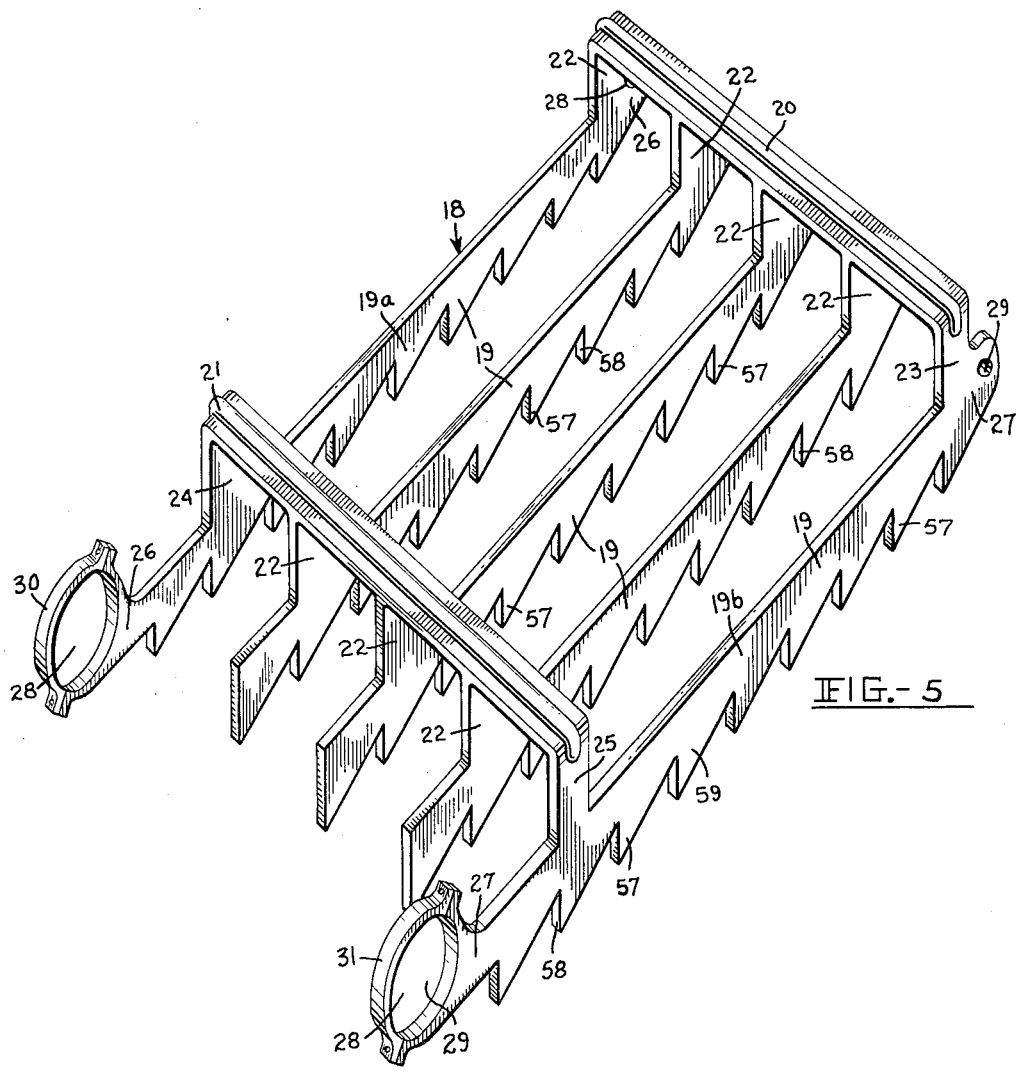

3,209,913
WATER INTAKE CLEANER
Kermit H. Burgin, Whitestown, Ind., assignor of eighty percent to Frederick B. Cline, Indianapolis, Ind.
Filed June 19, 1962, Ser. No. 203,513
4 Claims. (Cl. 210—154)

This invention relates to a construction for mechanically clearing a water intake from weeds and trash. In the form herein shown, the structure is applied to the water intake of a pump on a boat which might be employed to deliver water under high pressure and large volume for jet propelling the boat. The device is intended to be operated at will and held inoperative, depending upon the conditions encountered in driving the boat, particularly through or over weed beds and floating moss accumulations. Primarily the structure is intended which will engage matter accumulating over a grille across the water intake and carry it along and off the grille in a rather forceful manner.

A primary object of the invention is to provide a device of the nature above indicated and which will positively clean a grille and prevent its clogging from foreign matter encountered in the water entering through the grille into the water intake conduit or pipe wherein the water is flowing at a rather rapid velocity.

A further important object of the invention is to provide an exceedingly simple structure which may be durable over long periods of time and which may be manufactured and installed at a relatively low cost.

A still further important object of the invention is to provide a structure which will be substantially trouble free.

One particular form of the invention is illustrated in the accompanying drawings as would be applied to a boat, in which usage, the water intake would be through the bottom of the boat hull. This particular form is described in reference to the accompanying drawings, in which—

FIG. 1 is a view in side elevation and partial section through a structure embodying the invention;

FIG. 2 is a view in vertical transverse section on the line 2—2 in FIG. 1;

FIG. 3 is a vertical section on the line 3—3 in FIG.1;

FIG. 4 is a vertical section on the line 4—4 in FIG. 1;

FIG. 5 is a view in top rear perspective of a rake bar assembly;

FIG. 6 is a bottom plan view of a grille to which the invention is applied; and

FIG. 7 is a diagrammatic representation of the travel of the rake bar when in operation.

A grille generally designated by the numeral 10 is provided with a series of parallel bars 11 spaced apart a sufficient distance and in number with widths to permit the required flow of water between these bars. The grille has a mounting flange 12 therearound. The grille is mounted across an opening 13 in the bottom 14 of a boat to have the flange 12 engage against the margin of that opening as a means for fixing the grille in place. Where the boat bottom or hull 14 is normally of a thin thickness as now commonly used in small power boats, the grille will extend inside of the boat a distance above the bottom 14. In the form herein shown, there are four of these bars 11, and they are spaced apart to extend longitudinally in the direction of travel of the boat.

A water intake conduit 15 is sealably connected with or may be an integral part of the grille 10 and is devised to extend upwardly and to one side of the grille 10 above the boat bottom 14. That is water entering between the bars 11 will be received within the conduit 15 and in the present form, be directed rearwardly through the conduit portion 16. The interconnection of the conduit 15 with the grille 10 and the sealing of the grille 10 around the mounting flange 12 are such that water is completely sealed off from entering into the boat except through the conduit 15 and into the delivery end portion 16. Normally a pump (not shown) will be interconnected with the delivery end 16 which will take water from the conduit 15 and direct it as may be desired. Thus a strong current of water is set up to flow between the bars 11, and through the conduit 15. In the form herein shown, there is a water intake space 17, provided on each of the outer sides of the outermost bars 11, FIGS. 2–4.

A rake bar assembly, FIG. 5, generally designated by the numeral 18 is formed, preferably in a single unit wherein there is a rake bar 19 for each of the spaces between the grille bars 11 and the spaces 17. Thus with four bars 11, there will be five rakes 19. In the form herein shown, each of these rakes 19 is tied one with the other rakes through upper cross bars 20 and 21 to which the rakes 19 are interconnected by vertical risers 22, one riser at each end of the rakes. These risers 22 are employed on the three central rakes 19, and the outer rakes 19a and 19b are fixed in position in relation to the other bars 19 by means of the bars 20 and 21 having downturned ends 22, 23 and 24, 25 respectively.

The forward ends of the outer bars 19a and 19b have terminal end portions 26 and 27 respectively through which extend transverse holes 28 and 29 in each instance.

The rear end portions of the bars 19a and 19b terminate in upturned arms 26 and 27 respectively which have circular, transverse openings 28 and 29 therethrough respectively. These openings 28 and 29 in each instance have a semi-circular enclosing strap 30 and 31 which may be detachably secured and removed. These openings 28 and 29 are circular, and receive therein an eccentric wheel 32 and 33, and straps 30 and 31 engaging therearound to maintain the eccentrics within the openings 28 and 29. The two eccentric wheels 32 and 33 are fixed in a common rotary relation to a cross-shaft 34.

A pair of connecting rods 35 and 36 rockably supported on pins 37 and 38 are fixedly carried respectively to extend inwardly from outer grille enclosing walls 39 and 40, these walls extending upwardly and eventually merging into the wall of the conduit 15. The walls referred to are at the forward end of the grille, FIG. 1, and FIG. 2, and the pins 37 and 38 are above the bars 11. The outer ends of these connecting rods 35 and 36 are rockably interconnected by a pin 41 in each instance passing through the holes 28 and 29 of the rake bar assembly 18.

Normally there will be extending a pump drive shaft 43 through the conduit 15 extending from a drive motor (not shown) at the forward side of the conduit 15, FIG. 1, and back rearwardly through the conduit portion 16 to the pump to which reference has been made. Advantage of this fact is taken in the present form of the invention to reciprocate the rake bar assembly 18 by a power take-off through a bevel gear 44 fixed to the shaft 43, in constant mesh into the bevel gear 45 fixed to a shaft 46 extending vertically downwardly to have fixed thereon a member of a dog clutch 47 to be selectively engaged with a second dog clutch member 48 on a lower shaft 49; having a bevel gear 50 on its lower end in constant mesh with a bevel gear 51 fixed on the shaft 34. The clutch member 48 is lifted and lowered along the shaft 49 by any suitable means, such as by a rock lever 52 pivoted as at 53 on the supporting standard 54. A shaft 55 being rockably connected to the rear end of the lever 52 extends upwardly and out from the conduit portion 16 by an end 56 which may carry any suitable means (not shown) for vertically reciprocating the shaft. In this manner, the eccentrics 32 and 33 are turned with the shaft 34.

Operation

The rake bar assembly 18 is so proportioned that the undersides of the rake bars 19 include the outer bars 19a and 19b have teeth 57 spaced apart along their undersides with substantially vertically disposed rear edge portions 58 and forwardly and upwardly extending edges 59. These teeth 57 are to be carried in a reciprocating manner vertically and centrally between the bars 11, FIGS. 2–4, and FIG. 6, into the spaces 17, in such manner that in the travel of the rake bar assembly, the teeth will initially be lowered by the front end by the tooth 57a and progressively the outer teeth therebehind will be lowerd and pulled rearwardly extending below the undersides of the bars 11 in a clawing action so that any weeds which heve been drawn up by the current of water entering between the bars and the grille side walls will be initially arrested by the screening action of these spaced apart bars 11, and then in this clawing action, will be lowered and pushed or carried rearwardly so that in the forward travel of the boat, they will be left behind the grille 10. This action is repeated at a rate of travel determined by the ratio between the gears 44, 45, and 50, 51. The fore and aft travel of the rake bar speed should be rather slow, such for example as around 100 strokes per minute.

The motion of the rack assembly 18 may be observed or understood by referring to FIG. 7, where this travel of one specific rake bar 19, such as 19a, is illustrated.

Assuming as an initial position of the bar 19a, wherein it is shown in the solid line position carrying shading, the eccentric 33 be such that a point D will be substantially on a horizontal line through the axis of the shaft 34 and at the farthest station therefrom. With this position of the eccentric 33, the bar 19a will be in that position where the connecting rod center line will be on the line AR, R constituting the axis of rotation of that connecting rod 36. Then the eccentric 33, turning in direction of the arrow, will carry the point D around to the position E and the forward end of the rake bar will be carried downwardly and forwardly to have the point A carried to the point B. In this position, the rake bar 19a will be indicated by the long dash line representation. Continued rotation of the eccentric 33 will bring that point D around to the position F to lower the rear end of the rake bar 19a and push forwardly and slightly upwardly, the forward end portion to have the point A then coincide with the point C. It is in this action so far described that the forwardmost tooth 57a has been lowered to the position 57a–b which is below the bottom sides of the bars 11 indicated by the line 60. Then under points of the teeth 57 to the rear of the point 57a–b are far above that lower line 60. However as the eccentric 33 point D in question moves to the point F, the teeth 57 are progressively lowered to the dash dot line positions indicated by the numeral 57ac, so that the rearmost teeth are being rather rapidly lowered into the mass of weeds or trash which may be under the bars 11. Then upon continued rotation of the eccentric 33, the teeth are given a rearward travel to bring them to the positions 57ad which are the lowermost positions of the teeth at the full length of the bar 19a. This position of the teeth 57ad is represented by the short dash lines. The forward end of the bar 19a has been lowered by the swinging back of the connecting rod 36 to have its lower pin axis at the point B, following which that point is lifted and pulled to the rear, as the point G which is the lowermost point of travel of the point D is brought up to the original starting point D, wherein the rake bar then comes back to the solid line position.

In short, the rake bars 19 while reciprocating in fore and aft directions, have less downward travel at the front end than they do at the rear end in each instance during the full stroke. The desired inoperative position of the rake bar will be that as indicated for the position of the bar 19a. In this position, the teeth all with the exception of the last rear two possibly will clear the underside level of the grid bars. Of course the bars 11 may be so arranged in their up and down positions as to provide complete clearance if necessary, although due to the slopes 59, there will be no tendency for trash to hang up on the teeth 57.

Therefore it is to be seen that I have provided an exceeding simple structure for the maintaining of a clear grid water inlet flow. While I have herein shown my invention in this one particular form, it is obvious that mechanical changes may be employed without departing from the spirit of the invention, and I therefore do not desire to be limited to that precise described form beyond the limitations which may be imposed by the following claims.

I claim:

1. A structure for removing weeds, grass and foreign matter tending to enter a water inlet comprising
   a grille fixed across said inlet and having laterally spaced apart grille bars;
   a rake bar assembly having a rake bar entering between each of said grille bars and extending a major distance, longitudinally therealong;
   teeth along one side of each of said rake bars and having transverse widths permitting the travel of the rake bars and the teeth to travel within the spacing between the grille bars;
   a rake bar drive assembly at one end thereof, comprising oscillating means lifting, lowering said one end of and longitudinally reciprocating the assembly;
   a rake bar support at the opposite end of the rake bar assembly comprising a connecting rod having one end pivoted on an axis fixed in relation to travel of said assembly, the axis being spaced to one side of the rake bars removed from their tooth sides, the other end of the connecting rod being rockably connected to said rake bar assembly at its said opposite end; and
   said drive assembly in operation and swinging of said connecting rod confining the travel of the rake bar assembly in relation to said grille bars to extension of the teeth of the rake bars from the grille bars at said opposite ends of rake bars while retaining between the grille bars those teeth adjacent said drive means followed by progressive lowering of those adjacent teeth to have approximately uniform tooth length projection throughout the lengths of the grille bars, and then lifting the rake bars to carry all the teeth toward positions between the grille bars.

2. The structure of claim 1, in which said grille bars are approximately horizontally disposed such that said grille faces downwardly; and said connecting rod axis is located above the rake bars, and has a length to swing said opposite end of the rake bar assembly through an arc confined to travel of said rod-to-assembly-rockable-connection between two high points on the arc and an intermediate low point determining the lowest travel of said rake bar assembly opposite end.

3. The structure of claim 2 in which the pivot point of said rod on said axis is approximately on a vertical line including said low point; and said teeth have approximately vertical sides directed toward said drive means, and inclined opposite sides directed upwardly.

4. In a vertical flow stream,
   a grid fixed approximately horizontally across the stream;
   rake bars having teeth downwardly directed and disposed shiftable across said grille;
   bar oscillating drive means at one end of said grille and engaging ends of the bars; and
   bar support means at the opposite ends of the bars comprising at least one connecting rod extending beyond ends of the bars opposite from said one end of the grille and being rockably secured by one end thereto on a horizontally disposed axis above said bars and rockably attached by its other end to the bars permitting swinging between high and low points;

said drive means imparting a circular motion to said one ends of the rake bars thereby moving said one ends up and down in directions vertically and also horizontally away from and in return toward said grille one end; and said drive means being timed to cause said connecting rod to lift and hold said bar opposite ends upwardly while said drive means pulls the other bar ends back and starts lowering them.

References Cited by the Examiner

UNITED STATES PATENTS

| 1,698,387 | 1/29 | Broome | 210—154 |
| 1,751,421 | 3/30 | Reid | 210—154 |
| 1,751,422 | 3/30 | Reid | 210—154 |
| 1,773,576 | 8/30 | Downes | 210—154 |

REUBEN FRIEDMAN, *Primary Examiner.*

HERBERT L. MARTIN, *Examiner.*